United States Patent
Nishimi et al.

(10) Patent No.: US 8,593,677 B2
(45) Date of Patent: Nov. 26, 2013

(54) MOBILE PRINTING SYSTEM USING A DEVICE MANAGEMENT SERVER

(75) Inventors: Toshitsugu Nishimi, Osaka (JP); Tetsuya Nishino, Osaka (JP); Toru Yasui, Osaka (JP); Hiromasa Akamatsu, Osaka (JP); Yasuhiko Kida, Osaka (JP)

(73) Assignee: Kyocera Document Solutions Inc. (JP)

( * ) Notice: Subject to any disclaimer, the term of this patent is extended or adjusted under 35 U.S.C. 154(b) by 97 days.

(21) Appl. No.: 13/308,089

(22) Filed: Nov. 30, 2011

(65) Prior Publication Data

US 2012/0147420 A1    Jun. 14, 2012

(30) Foreign Application Priority Data

| Dec. 8, 2010 | (JP) | 2010-273497 |
| Dec. 8, 2010 | (JP) | 2010-273498 |
| Dec. 8, 2010 | (JP) | 2010-273499 |
| Dec. 8, 2010 | (JP) | 2010-273500 |
| Dec. 8, 2010 | (JP) | 2010-273501 |
| Dec. 8, 2010 | (JP) | 2010-273502 |
| Oct. 20, 2011 | (JP) | 2011-230305 |
| Oct. 20, 2011 | (JP) | 2011-230306 |
| Oct. 20, 2011 | (JP) | 2011-230307 |
| Oct. 20, 2011 | (JP) | 2011-230308 |
| Oct. 20, 2011 | (JP) | 2011-230309 |
| Oct. 20, 2011 | (JP) | 2011-230310 |

(51) Int. Cl.
*G06F 15/00*    (2006.01)

(52) U.S. Cl.
USPC .................................................... 358/1.15

(58) Field of Classification Search
USPC .................................................... 358/1.15
See application file for complete search history.

(56) References Cited

U.S. PATENT DOCUMENTS

2002/0035546 A1 *  3/2002  Aoki .............................. 705/52

FOREIGN PATENT DOCUMENTS

| JP | 2004-021860 | 1/2004 |
| JP | 2010-219680 | 9/2010 |

* cited by examiner

*Primary Examiner* — Saeid Ebrahimi Dehkordy
(74) *Attorney, Agent, or Firm* — Stephen Chin

(57) ABSTRACT

A mobile printing system includes a cloud server apparatus, a mobile terminal device, a device management server apparatus, a print-control device, and an image forming apparatus. The cloud server apparatus stores a document data file. The mobile terminal device includes a wireless communication interface, and a short-range communication interface of which the maximum communicable distance is shorter than that of the wireless communication interface, and transmits the document data file with its device ID to the cloud server apparatus. The device management server apparatus receives the document data file in association with the device ID, and converts the document data file to print data and stores it. The print-control device detects the mobile terminal device using a short-range communication interface, and receives its device ID, and receives the print data from the document management server apparatus, and transmits the print data to the image forming apparatus for printing.

18 Claims, 14 Drawing Sheets

FIG. 4

| DEVICE ID | PRINT SETTING DATA | CHARGE DATA | PRINT DATA LIST |
|---|---|---|---|

MOBILE PRINTING SYSTEM USING A DEVICE MANAGEMENT SERVER

CROSS-REFERENCE TO RELATED APPLICATIONS

This application relates to and claims priority rights from Japanese Patent Applications: No. 2010-273497, filed on Dec. 8, 2010, No. 2010-273498, filed on Dec. 8, 2010, No. 2010-273499, filed on Dec. 8, 2010, No. 2010-273500, filed on Dec. 8, 2010, No. 2010-273501, filed on Dec. 8, 2010, No. 2010-273502, filed on Dec. 8, 2010, No. 2011-230305, filed on Oct. 20, 2011, No. 2011-230306, filed on Oct. 20, 2011, No. 2011-230307, filed on Oct. 20, 2011, No. 2011-230308, filed on Oct. 20, 2011, No. 2011-230309, filed on Oct. 20, 2011, and No. 2011-230310, filed on Oct. 20, 2011, the entire disclosures of which are hereby incorporated by reference herein.

BACKGROUND OF THE INVENTION

1. Field of the Invention

This invention relates to mobile printing systems using a device management server.

2. Description of the Related Art

Recently, mobile terminal devices such as mobile phone and smart phone are widely used. Some printing systems using such mobile phone are proposed.

In a typical printing system using a mobile phone, to transmit a document from a user (transmitting user) to another user (receiving user), a client PC performs (a) determining an office building or a floor where a mobile phone of the receiving user is located using position detection service of the mobile phone network from the mobile-phone number specified by the transmitting user, (b) searching the mobile phone of the receiving user (i.e. the mobile phone which number is specified) by using a Bluetooth device connected to a printer disposed in the office building or on the floor, (c) choosing a printer connected to the Bluetooth device which detects the mobile phone of the receiving user for printing the document, (d) transmitting an email to the mobile phone of the receiving user for inquiring whether the user accepts the chosen printer for printing, and (e) performing printing of the document according to an acceptance response from the mobile phone of the receiving user.

In another typical printing system, a multi function peripheral (MFP) establishes a connection with a mobile phone using Bluetooth, receives image data from the mobile phone, and performs printing based on the image data.

Since aforementioned printing systems do not manage a device ID unique to a mobile terminal device such as mobile phone, a single device hardly performs a printing-related process (charge process, managing print setting, etc.) different for each of mobile terminal devices such as mobile phone intensively.

For example, in case that a printer performs such printing-related process, if plural printers are used in the system, each of the printers must manage the device ID of the mobile terminal device, and an administrator, a user, or the like must operate all the printers for registering the device ID, and for registering and changing print-setting information. However, this is not practical due to a lot of burden.

SUMMARY OF THE INVENTION

The present disclosure relates to a mobile printing system which intensively performs a printing-related process (charge process, managing print setting, managing authorization setting, etc.) different for each of mobile terminal devices using a device management server.

A mobile printing system according to an aspect of the present disclosure includes a cloud server apparatus, a mobile terminal device, a device management server apparatus, a print-control device, and an image forming apparatus. The cloud server apparatus is configured to store a document data file. The mobile terminal device, includes a wireless communication interface and a first short-range communication interface of which the maximum communicable distance is shorter than that of the wireless communication interface, is configured to transmit the document data file with its device ID to the cloud server apparatus via the wireless communication interface. The device management server apparatus is configured to receive the document data file in association with the device ID from the cloud server apparatus, convert the document data file to print data, store the print data, and transmit the print data to the print-control device. The print-control device, includes a second short-range communication interface of a communication protocol which is the same as that of the first short-range communication interface, is configured to detect the mobile terminal device, receive the device ID of the mobile terminal device, receive the print data corresponding to the document data file in association with the device ID from the document management server apparatus, and transmit the print data to the image forming apparatus. The image forming apparatus is configured to receive the print data from the print-control device, and perform printing of the print data.

A mobile printing system according to another aspect of the present disclosure includes a cloud server apparatus, a mobile terminal device, a device management server apparatus, and an image forming apparatus. The cloud server apparatus is configured to store a document data file. The mobile terminal device, includes a wireless communication interface and a first short-range communication interface of which the maximum communicable distance is shorter than that of the wireless communication interface, is configured to transmit the document data file with its device ID to the cloud server apparatus via the wireless communication interface. The device management server apparatus is configured to receive the document data file in association with the device ID from the cloud server apparatus, convert the document data file to print data, store the print data, and transmit the print data to the image forming apparatus. The image forming apparatus, includes a second short-range communication interface of a communication protocol which is the same as that of the first short-range communication interface, is configured to detect the mobile terminal device, receive the device ID of the mobile terminal device, receive the print data corresponding to the document data file in association with the device ID from the document management server apparatus, and perform printing of the print data.

BRIEF DESCRIPTION OF THE DRAWINGS

FIG. 4 shows a structure of registered-device data stored in a storage device in the device management server apparatus;

DETAILED DESCRIPTION

Embodiment 1

Figure 1:
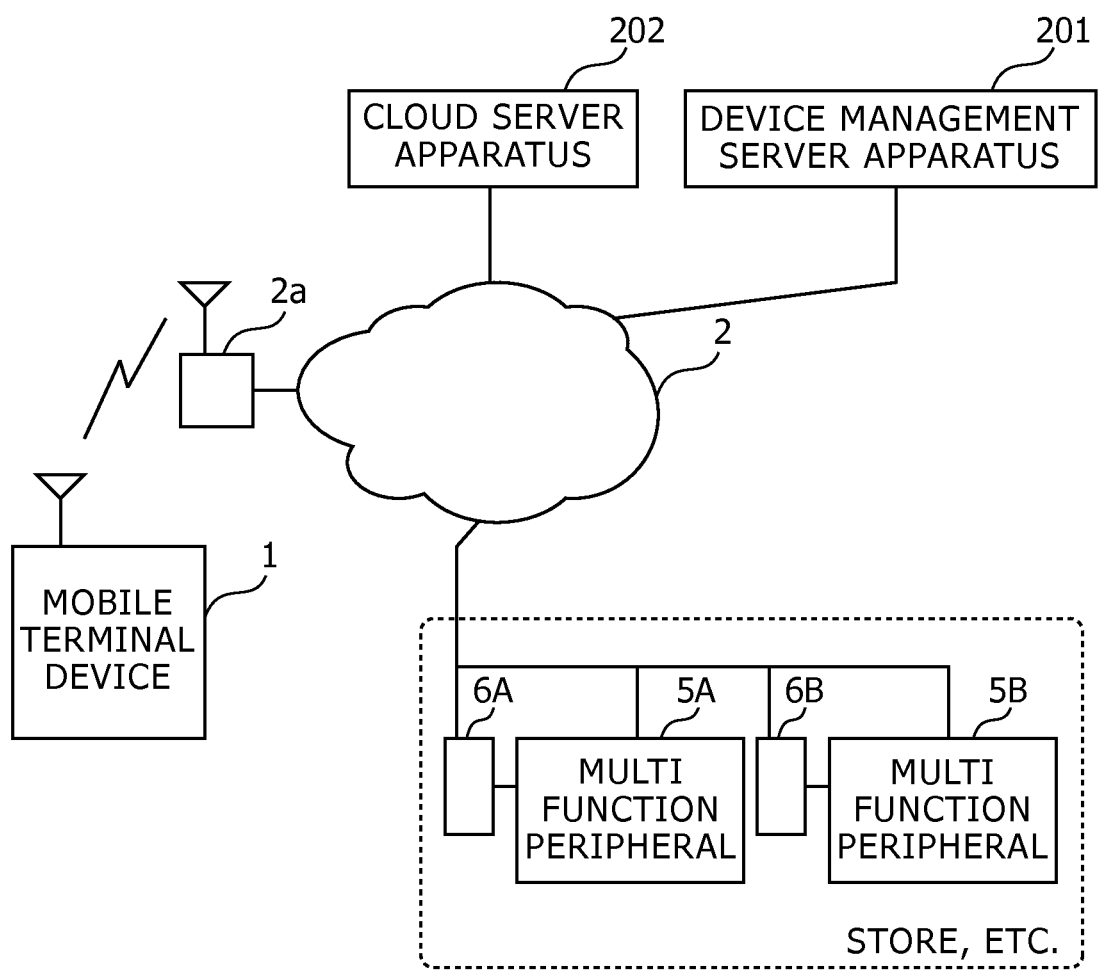
FIG. 1 shows a block diagram that indicates a configuration of an image forming system in Embodiment 1.

FIG. 1 shows a block diagram that indicates a configuration of an image forming system in Embodiment 1 of this disclosure. In this image forming system, a mobile terminal device 1 carried by a user connects to a network 2 via a base station 2a by wireless communication. A device management server apparatus 201 and a cloud server apparatus 202 are connected to the network 2. In addition, one or more set top boxes 6A and 6B are connected to the network 2, and the one or more set top boxes 6A and 6B is/are connected to one or more multi function peripherals 5A and 5B disposed in stores, public facilities such as school and so on, respectively. It should be noted that if there are a plurality of users, the users may have mobile terminal devices which are the same as the mobile terminal device 1, respectively, although one mobile terminal device 1 is depicted in FIG. 1.

The network 2 is a wide area network such as Internet. The network 2 may be a LAN or a network which includes a wide area network and a LAN connected to the wide area network.

The mobile terminal device 1 is a small portable terminal device such as smart phone, and has a wireless communication interface and a short-range communication interface which maximum communicable distance is shorter than that of the wireless communication interface, and transmits device ID unique to this mobile terminal device 1 and a document data file using the wireless communication interface.

The multi function peripheral 5A is an image forming apparatus which has a printer function, a scanner function, a copy function, and a facsimile function, and so on, and performs jobs using the aforementioned functions according to an instruction from an operation panel on the multi function peripheral 5A, a set top box 6A, and so on. In Embodiment 1, the set top box 6A is connected to the multi function peripheral 5A, and the set top box 6A supplies print data to the multi function peripheral 5A, and the multi function peripheral 5A performs printing based on the print data using the printer function. The multi function peripheral 5B has a configuration which is either the same as or similar to that of the multi function peripheral 5A.

The set top box 6A detects the mobile terminal device 1 around the set top box 6A, and obtains a device ID of the detected mobile terminal device 1 upon detecting the mobile terminal device 1, and transmits a transmission request for print data received with the device ID by the device management server apparatus 201, and receives the print data, and supplies the print data to the multi function peripheral 5A to cause to perform printing based on the print data. The set top box 6A has a short-range communication interface of a communication protocol which is the same as that of the short-range communication interface of the mobile terminal device 1, and detects a mobile terminal device 1 around this set top box 6A. The set top box 6B has a configuration which is either the same as or similar to that of the set top box 6A.

The device management server apparatus 201 downloads one or more document data files in association with one or more device IDs unique to one or more predetermined mobile terminal devices 1 from the cloud server apparatus 202, and transmits print data corresponding to the document data file to the set top box 6A or 6B upon receiving a request from the set top box 6A or 6B. This print data has a data format which can be processed by the multi function peripheral 5A or 5B. The device management server apparatus 201 stores the print data in association with the device ID of the mobile terminal device 1 in an internal storage device, an external database server, or the like, and receives a print-data-transmission request with the device ID from the set top box 6A or 6B, and transmits the print data in association with the received device ID to the set top box 6A or 6B as the requester. It is favorable that the device management server apparatus 201 converts the document data file to the print data before receiving the request from the set top box 6A or 6B.

The cloud server apparatus 202 is a server of a cloud service that provides a storage function such as Evernote, Dropbox, Google document, or Picasa web album. This cloud service assigns an account to a user. According to the user's operation, the mobile terminal device 1 uploads a document data file to the cloud server apparatus 202, and the document data file is stored in association with the account in the cloud service. Further, in this cloud service, the device management server apparatus 201 has an account which enables the device management server apparatus 201 to access the document data file stored in the cloud service, and the device management server apparatus 201 can read out a document data file of the user of the mobile terminal device 1 with the user authority of this account from the cloud server apparatus 202. The user specifies a document data file from document data files stored in the cloud service, and the cloud server apparatus 202 relates the specified document data file to the device ID of the mobile terminal device 1 of this user according to an instruction based on a user operation inputted to the mobile terminal device 1. Hereinafter, this process is called "print reservation." For example, the user specifies the document data file using the mobile terminal device 1 or another personal computer. Further, for example, the mobile terminal device 1 obtains a list of document data files stored in the cloud service from the cloud server apparatus 202, and displays the list, and notifies a document data file selected by the user in the list to the cloud server apparatus 202, and the cloud server apparatus 202 relates the selected document data file to the device ID of the mobile terminal device 1 of this user.

Figure 2:
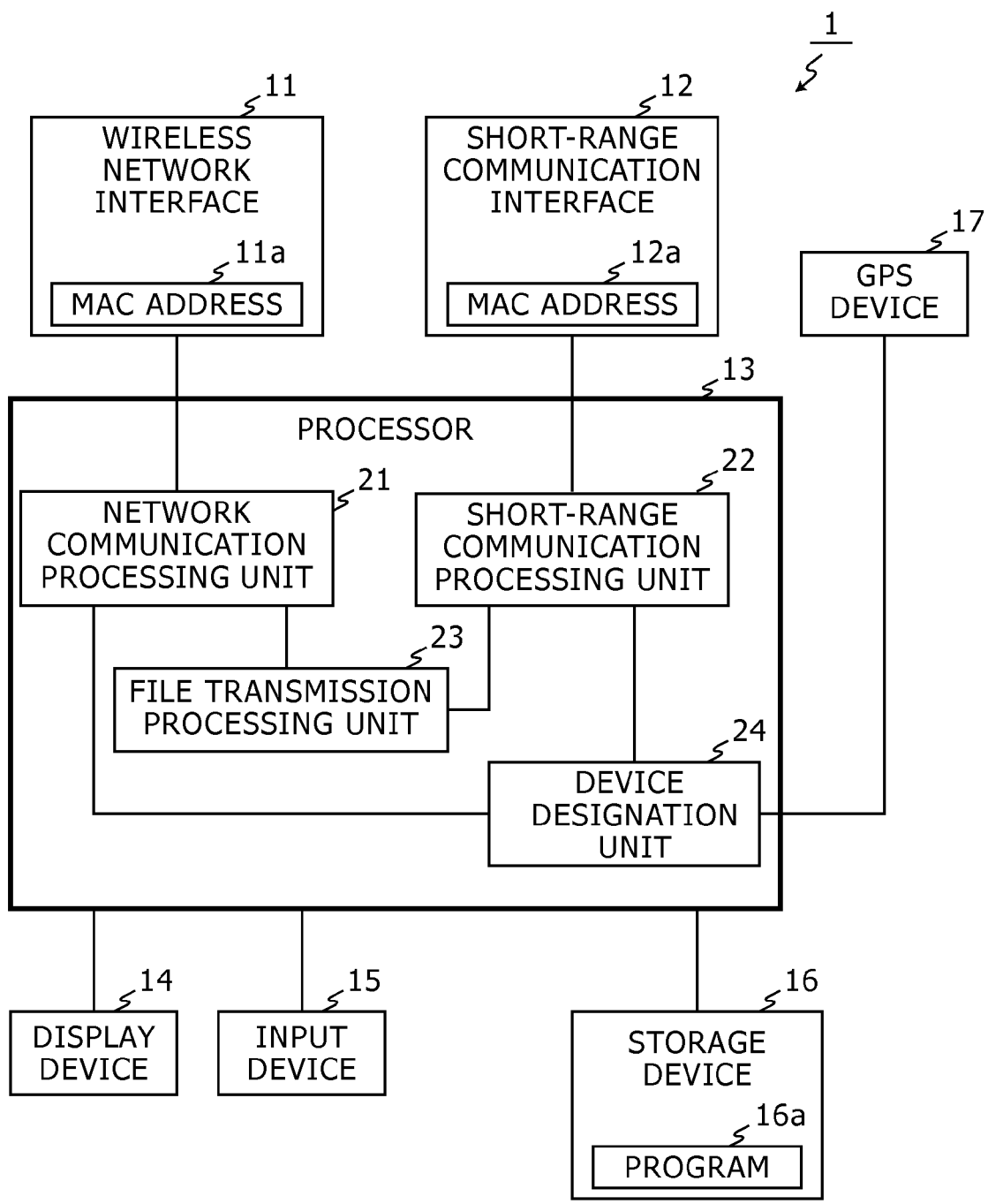
FIG. 2 shows a block diagram that indicates a configuration of a mobile terminal device in the image forming system of Embodiment 1.

FIG. 2 shows a block diagram that indicates a configuration of a mobile terminal device in the image forming system of Embodiment 1.

The mobile terminal apparatus 1 has a wireless network interface 11, a short-range communication interface 12, a processor 13, a display device 14, an input device 15, a storage device 16, and a GPS device 17 which is an instance of the first position determination device.

The wireless network interface 11 is a circuit which connects a wireless LAN (Local Area Network). The wireless network interface 11 has a MAC (Media Access Control) address unique to this wireless network interface 11. For example, the wireless network interface 11 is a wireless LAN interface of IEEE 802.11. In general, a wireless LAN interface of IEEE 802.11 has the maximum communicable distance of about 50 meters without any obstacles. To connect to the network 2, a baseband circuit of a mobile phone may be used instead of the wireless network interface 11. In such case, the mobile terminal device 1 connects via a mobile phone line to the network 2.

The maximum communicable distance of the short-range communication interface 12 is shorter than that of the wireless network interface 11, and the short-range communication interface 12 is a circuit which performs wireless communication with an interface of the same protocol which is positioned within a relatively short distance (e.g. within about 10 meters). In Embodiment 1, the short-range communication interface 12 is a Bluetooth communication circuit of either Power Class 2 or Power Class 3. A Bluetooth communication circuit of Power Class 2 has the maximum communicable distance of about 10 meters without any obstacles. A Bluetooth communication circuit of Power Class 3 has the maximum communicable distance of about 10 centimeters without any obstacles.

The short-range communication interface 12 has a MAC address 12a unique to this short-range communication interface 12. MAC addresses are uniquely assigned to interfaces, respectively, and therefore, the MAC address 11a and the MAC address 12a have different values from each other.

The processor 13 is configured, for example, as a computer which has a CPU (Central Processing Unit), a ROM (Read Only Memory), a RAM (Random Access Memory), etc. In the processor 13, the CPU loads a program 16a stored in the ROM or the storage device 16 to the RAM, and executes the program to form processing units. A network communication processing unit 21, a short-range communication processing unit 22, a file transmission processing unit 23, a device designation unit 24, and so on are formed in the processor 13. In Embodiment 1, the program 16a is stored in the non-volatile storage device 16. The program 16a may be installed in the storage device 16 from a portable recording medium such as CD-ROM in which the program has been recorded originally. Otherwise, the program 16a may be downloaded from an unshown application store server on the network 2, and installed in the storage device 16.

The network communication processing unit 21 performs data communication with a device (e.g. device management server apparatus 201) connected to the network 2 according to a predetermined protocol (e.g. HTTP: Hypertext Transfer Protocol) by controlling the wireless network interface 11.

The short-range communication processing unit 22 establishes a connection with a short-range communication interface of another device within the communicable range and performs data communication with the device by controlling the short-range communication interface 12. The short-range communication processing unit 22 transmits the device ID to a device (here, the set top box 6A or 6B) which has a short-range communication interface of the same protocol as that of the short-range communication interface 12, and causes the device to obtain print data corresponding to a document data file which the device management server apparatus 201 receives with this device ID, and causes the device to perform printing based on the print data.

The file transmission processing unit 23 reads out the MAC address 12a of the short-range communication interface 12 using the short-range communication processing unit 22, and sets this MAC address 12a as the device ID of this mobile terminal device 1, and transmits this device ID with a document data file to the device management server apparatus 201 by using the wireless network interface 11 and the network communication processing unit 21. For example, the document data file is a file generated by an office application of Microsoft Corporation, a text file, a PDF (Portable Document Format) file, an image file such as JPEG (Joint Photographic Experts Group) file, or the like.

The device designation unit 24 selects a set top box (either the set top box 6A or 6B) to be used for printing upon detecting one or more short-range communication interfaces (e.g. the short-range communication interface of the set top box 6A or 6B) positioned in the neighborhood.

For example, the device designation unit 24 displays a list of the detected one or more short-range communication interfaces in the display device 14, and selects one (i.e. the set top box 6A or 6B) in the list as the set top box to be used for printing according to a user's selection operation to the input device 15.

Otherwise, the device designation unit 24 automatically selects one of the detected one or more short-range communication interfaces. In this case, for example, if one short-range communication interface is detected, then the detected short-range communication interface is selected, and if plural short-range communication interfaces are detected, then one with the largest electric field intensity detected by the short-range communication interface 12 is selected from the detected short-range communication interfaces.

The display device 14 includes, for instance, a liquid crystal display, some indicators, and so on. The input device 15 includes, for instance, a touch panel, a button switch, and so on. The storage device 16 is a non-volatile storage device such as flash memory or hard disk drive in which a program and/or data is/are stored.

Figure 3:
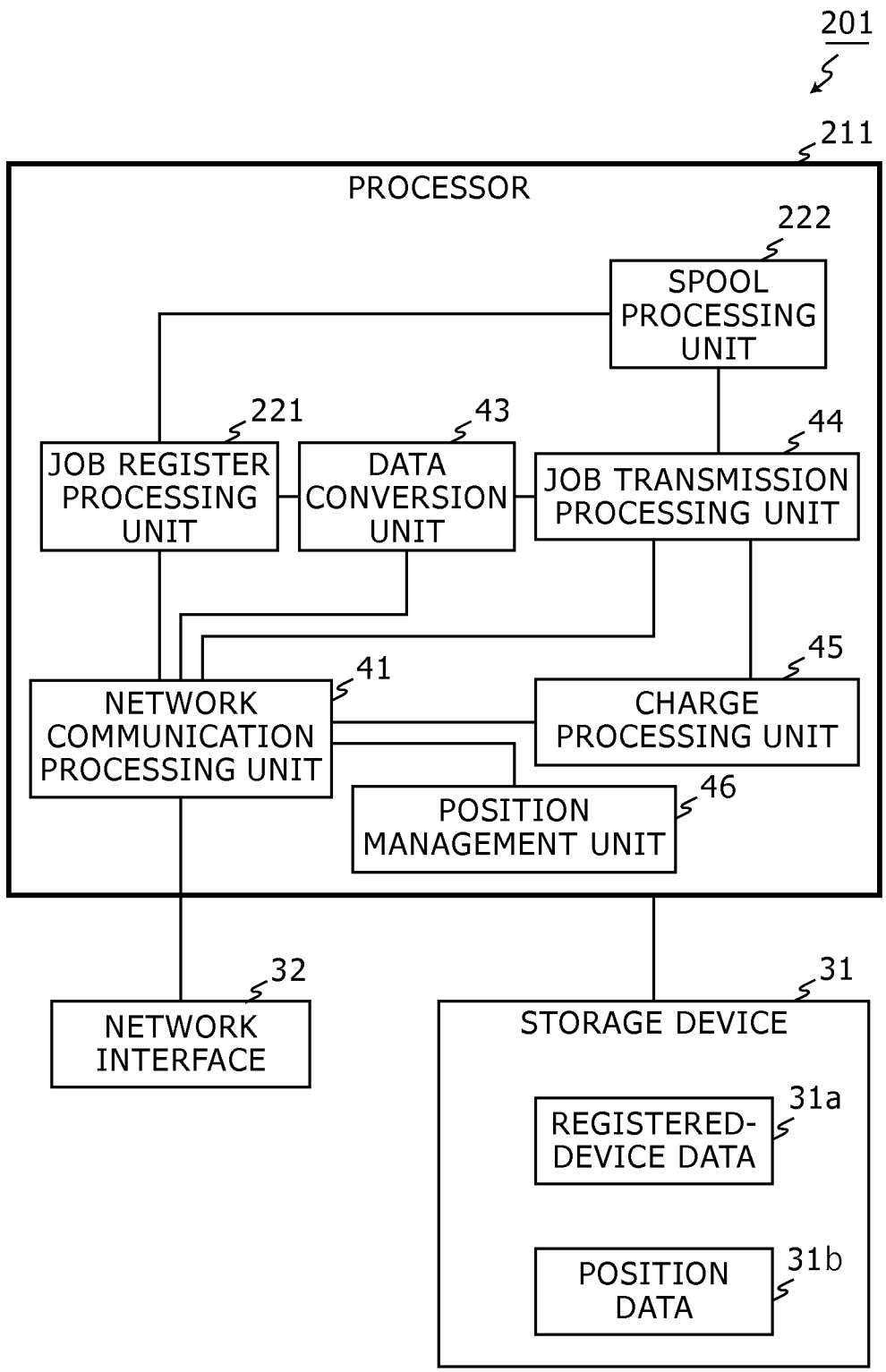
FIG. 3 shows a block diagram that indicates a configuration of a device management server apparatus in the image forming system of Embodiment 1.

FIG. 3 shows a block diagram that indicates a configuration of a device management server apparatus 201 in the image forming system of Embodiment 1.

The device management server apparatus 201 has a storage device 31, a network interface 32, and a processor 211.

The storage device 31 is a device in which a program and/or data is stored. A non-volatile semiconductor memory, a hard disk drive, or the like is used as the storage device 31. In the storage device 31, registered-device data 31a and position data 31b are stored.

FIG. 4 shows a structure of the registered-device data 31a stored in the storage device 31 in the device management server apparatus 201.

The registered-device data 31a includes one or more device IDs (e.g. MAC address) unique to one of more mobile terminal devices which has/have been registered such as the mobile terminal device 1. In addition, the registered-device data 31a includes print setting data, charge data, print data list, and so on in association with each of the device ID.

The print setting data is data to specify print setting applied to a document data file received from the mobile terminal device of the device ID which is registered in association with this print setting data. For example, the print setting data includes values of setting items such as number of print copies, paper-sheet setting (sheet size, sheet orientation, etc.), color setting (color printing or monochrome printing), aggregate-print setting, simplex/duplex setting, resolution setting, and economy-print setting. Further, the print setting data may include authorization setting in association with the device ID. For example, the authorization setting is registered by using an administrator's terminal device connected to the network 2. The authorization setting includes one or more values of restriction setting items such as the upper limit number of print pages, monochrome-print restriction, economy-print restriction, aggregate-print restriction, and duplex-print restriction.

The charge data includes charge method information, chargee information, information on total amount of charge, and so on. The charge data may include information corresponding to a charge amount such as the value of a page counter which counts the number of printed pages.

The print data list is a list of one or more pieces of print data on which printing is not finished.

The position data 31*b* has an ID and current position information (e.g. latitude, longitude, and altitude) in association with the ID for each of the set top boxes 6A and 6B.

The network interface 32 is connected to the network 2, and performs data communication with another device connected to the network 2 (e.g. the mobile terminal device 1, the set top box 6A or 6B, etc.).

It should be noted that the print setting data in the registered-device data 31*a* is default print setting data, and if print setting data is registered in the cloud server apparatus 202, then the print setting data registered in the cloud server apparatus 202 is downloaded and used. For example, the mobile terminal device 1 registers and/or edits the print setting data in the cloud server apparatus 202 according to a user operation to the mobile terminal device 1.

The processor 211 is configured, for example, as a computer which has a CPU, a ROM, a RAM, etc. In the processor 211, the CPU loads a program stored in the ROM or the storage device 31 to the RAM, and executes the program to form processing units. A network communication processing unit 41, a job register processing unit 221, a data conversion unit 43, a job transmission processing unit 44, a charge processing unit 45, a position management unit 46, a spool processing unit 222, and so on are formed in the processor 211.

The network communication unit 41 performs data communication with another device connected to the network 2 according to a predetermined protocol by using the network interface 32.

The job register processing unit 221 performs the following processes repeatedly at predetermined timings: (a) login to the cloud server apparatus 202 via the network 2 using the network communication processing unit 41, (b) checking whether or not one or more document data files in association with one or more device IDs registered in the registered-device data 31*a* in the storage device 31 is/are newly stored in the cloud server apparatus 202, and (c) downloading such one or more document data files if such one or more document data files is/are newly stored in the cloud server apparatus 202. The job register processing unit 221 registers one or more pieces of print data corresponding to the downloaded one or more document data files to the spool processing unit 222.

The spool processing unit 222 stores the print data in the storage device 31 and reads out the print data from the storage device 31.

The data conversion unit 43 converts the document data file to the print data. If the multi function peripheral 5A or 5B is capable of processing PDL (Page Description Language) data, then the data conversion unit 43 converts the document data file to PDL data. The data conversion unit 43 may convert the document data file to PDF data if PDF data can be processed by the multi function peripheral 5A or 5B. Further, the data conversion unit 43 obtains either print setting data in association with the device ID from the registered-device data 31*a* or print setting data downloaded from the cloud server apparatus 202, and generates the print data based on print setting specified by the print setting data.

The job transmission processing unit 44 transmits print data corresponding to a document data file upon receiving a transmission request. This print data can be processed by the multi function peripheral 5A or 5B. The job transmission processing unit 44 receives the request and the device ID of the mobile terminal device 1 from a requester of print data (in Embodiment 1, the set top box 6A or 6B), and transmits print data corresponding to a document data file received by the job register processing unit 42 from the mobile terminal device 1 which has the device ID received from the requester. For example, this print data is identified from the print data list and the device ID in the registered-device data 31*a*.

The charge processing unit 45 generates charge data (charge amount, number of printed pages, etc.) of printing based on the print data corresponding to a device ID, and updates charge data (e.g. sum-up values) of the device ID in the registered-device data 31*a* according to the generated charge data.

The position management unit 46 receives their IDs and their current position information from the set top boxes 6A and 6B by using the network communication processing unit 41, and registers their IDs and their current position information in the position data 31*b*. The position management unit 46 identifies the set top box nearest to the current position of the mobile terminal device 1 in the set top boxes 6A and 6B according to the position data 31*b*, and transmits the ID of the identified set top box to the mobile terminal device 1. Specifically, the position management unit 46 calculates the distances between the current position of the mobile terminal device 1 based on the current position information from the mobile terminal device 1 and the current positions (e.g. disposed positions) of the set top boxes 6A and 6B registered in the position data 31*b*, and identifies the set top box with the shortest distance, and reads out the ID of the identified set top box from the position data 31*b* and transmits it.

Figure 5:
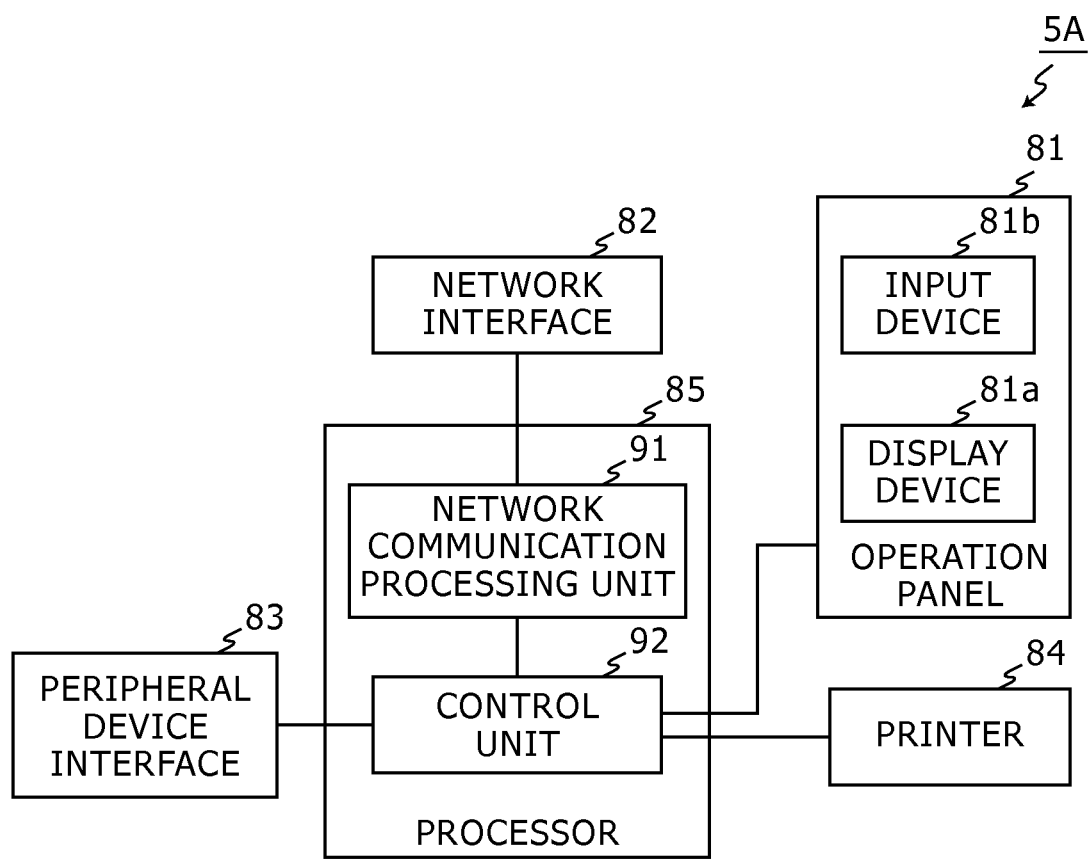
FIG. 5 shows a block diagram that indicates a configuration of a multi function peripheral in the image forming system of Embodiment 1.

FIG. 5 shows a block diagram that indicates a configuration of the multi function peripheral 5A in the image forming system of Embodiment 1. The multi function peripheral 5B has a configuration which is either the same as or similar to that of the multi function peripheral 5A.

The multi function peripheral 5A has an operation panel 81, a network interface 82, a peripheral device interface 83, a printer 84, and a processor 85.

The operation panel 81 is disposed on a surface of a housing of the multi function peripheral 5A, and includes a display device 81*a* to display some information to a user and an input device 81*b* to receive a user operation. The display device 81*a* includes, for instance, a liquid crystal display, some indicators, and so on. The input device 81*b* includes, for instance, a touch panel, a button switch, and so on.

The network interface 82 is capable of connecting to the network 2, and performs data communication with another device connected to the network 2.

The peripheral device interface 83 is a communication circuit of a predetermined standard such as USB (Universal Serial Bus).

The printer 84 is an internal device which performs printing on a paper sheet based on print data, and outputs the printed paper sheet. In case of an electrographic system, the printer 84 charges a photoconductor drum, and forms an electrostatic latent image on the photoconductor drum by irradiating a light from a light source in accordance with the print data, and develops a toner image of the electrostatic latent image, and transfers the toner image to the paper sheet, and fixes the toner image on the paper sheet, and outputs the paper sheet.

The processor 85 is a device which controls internal devices in the multi function peripheral 5A and performs data processing. The processor 85 is configured, for example, as a computer which has a CPU, a ROM, a RAM, etc. In the processor 85, the CPU loads a program stored in the ROM or a storage device (e.g. flash memory) to the RAM, and executes the program to form processing units. A network communication processing unit 91, a control unit 92, and so on are formed in the processor 85.

The network communication processing unit 91 is capable of performing data communication with a device connected to the network 2 according to a predetermined protocol by using the network interface 82.

The control unit 92 receives print data via the network interface 82 or the peripheral device interface 83, and performs data processing (rasterization, halftoning, etc.) for the received print data, and performs printing by controlling the printer 84 according to the processed print data.

Figure 6:
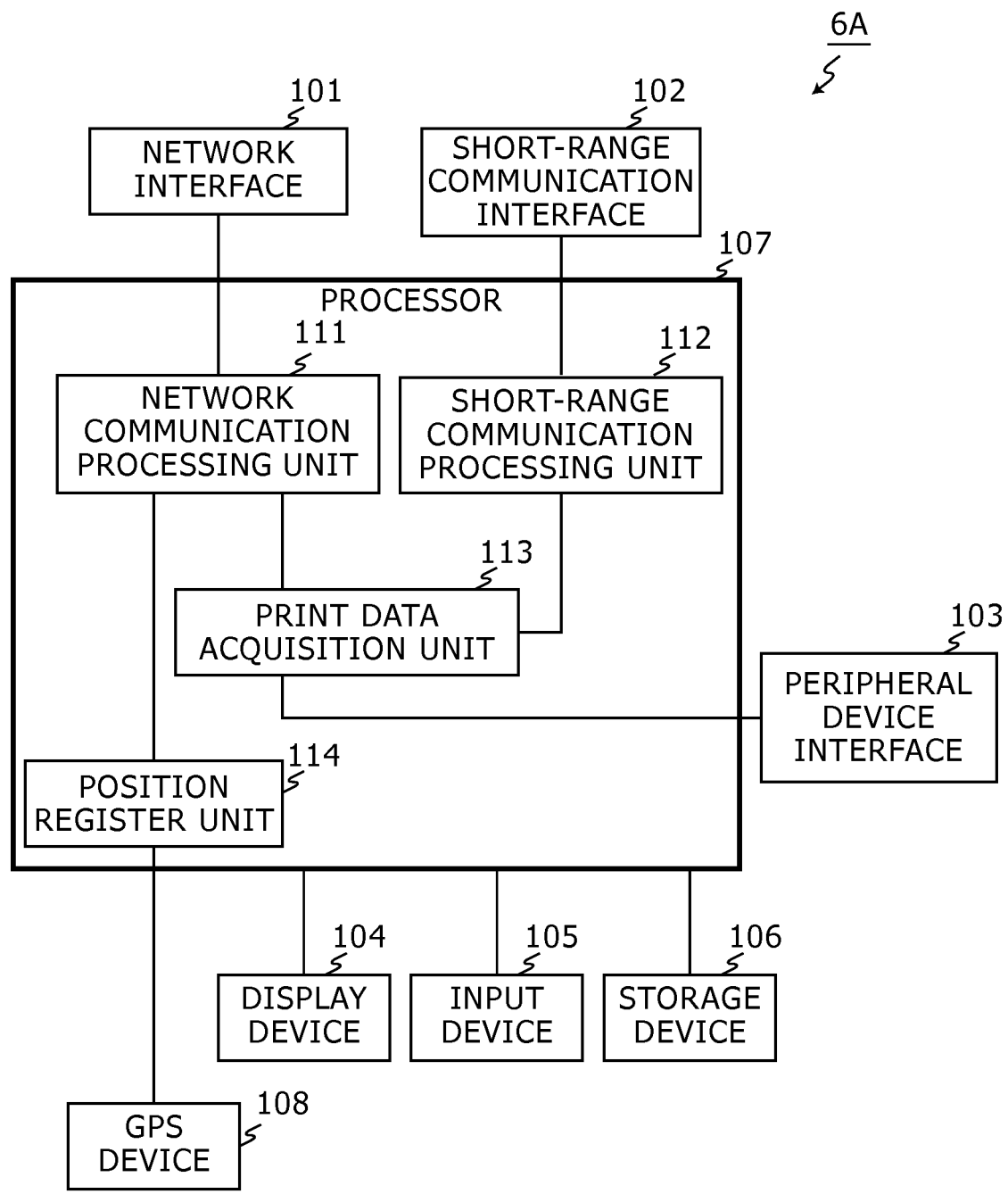
FIG. 6 shows a block diagram that indicates a configuration of a set top box in the image forming system of Embodiment 1.

FIG. 6 shows a block diagram that indicates a configuration of the set top box 6A in the image forming system of Embodiment 1. The set top box 6B has a configuration which is either the same as or similar to that of the set top box 6A.

The set top box 6A has a network interface 101, a short-range communication interface 102, a peripheral device interface 103, a display device 104, an input device 105, a storage device 106, a processor 107, and a GPS device 108 which is an instance of the second position determination device.

The network interface 101 is a circuit connected to the network 2 and performs data communication with another device connected to the network 2.

The short-range communication interface 102 is an interface of the same communication protocol as that of the short-range communication interface 12 of the mobile terminal device 1, and therefore can establish a connection with the short-range communication interface 12.

The peripheral device interface 103 is an interface of the same protocol as that of the peripheral device interface 83 of the multi function peripheral 5A, and connects to the peripheral device interface 83.

The display device 104 includes, for instance, a liquid crystal display, some indicators, and so on. The input device 105 includes, for instance, a touch panel, a button switch, and so on. The storage device 106 is a non-volatile storage device such as flash memory or hard disk drive in which a program and/or data is/are stored. The GPS device 108 receives radio waves from GPS satellites and measures a current position of the set top box 6A based on the radio waves, and outputs current position information (e.g. latitude, longitude, and altitude) obtained from the measurement.

The processor 107 is configured, for example, as a computer which has a CPU, a ROM, a RAM, etc. In the processor 107, the CPU loads a program stored in the ROM or the storage device 106 to the RAM, and executes the program to form processing units. A network communication processing unit 111, a short-range communication processing unit 112, a print data acquisition unit 113, a position register unit 114, and so on are formed in the processor 107.

The network communication processing unit 111 performs data communication with a device (e.g. device management server apparatus 201) connected to the network 2 according to a predetermined protocol (e.g. HTTP) by controlling the network interface 101.

The short-range communication processing unit 112 establishes a connection with a short-range communication interface of another device positioned within the communicable range and performs data communication with the device by controlling the short-range communication interface 102.

If the short-range communication processing unit 112 establishes a connection with the mobile terminal device 1 by the short-range communication interface 102, then the short-range communication processing unit 112 obtains its device ID (here, MAC address 12a) from the mobile terminal device 1.

The print data acquisition unit 113 transmits a print-data-transmission request to the device management server apparatus 201 by using the network communication processing unit 111 together with a device ID immediately after the short-range communication processing unit 112 obtains the device ID from the mobile terminal device 1, and receives print data as a response of the request, and transmits the print data to the multi function peripheral 5A by using the peripheral device interface 103.

The position register unit 114 obtains the current position information from the GPS device 108 and transmits the current position information and the ID of this set top box 6A to the device management server apparatus 201 by using the network communication processing unit 111 to register them in the position data 31b either at the timing when the set top box 6A is disposed or periodically. The ID of the set top box 6A is an ID of the short-range communication interface 102, and this ID can be identified before the short-range communication interface 12 establishes a connection with the short-range communication interface 102.

<The First Operation>

Figure 7:
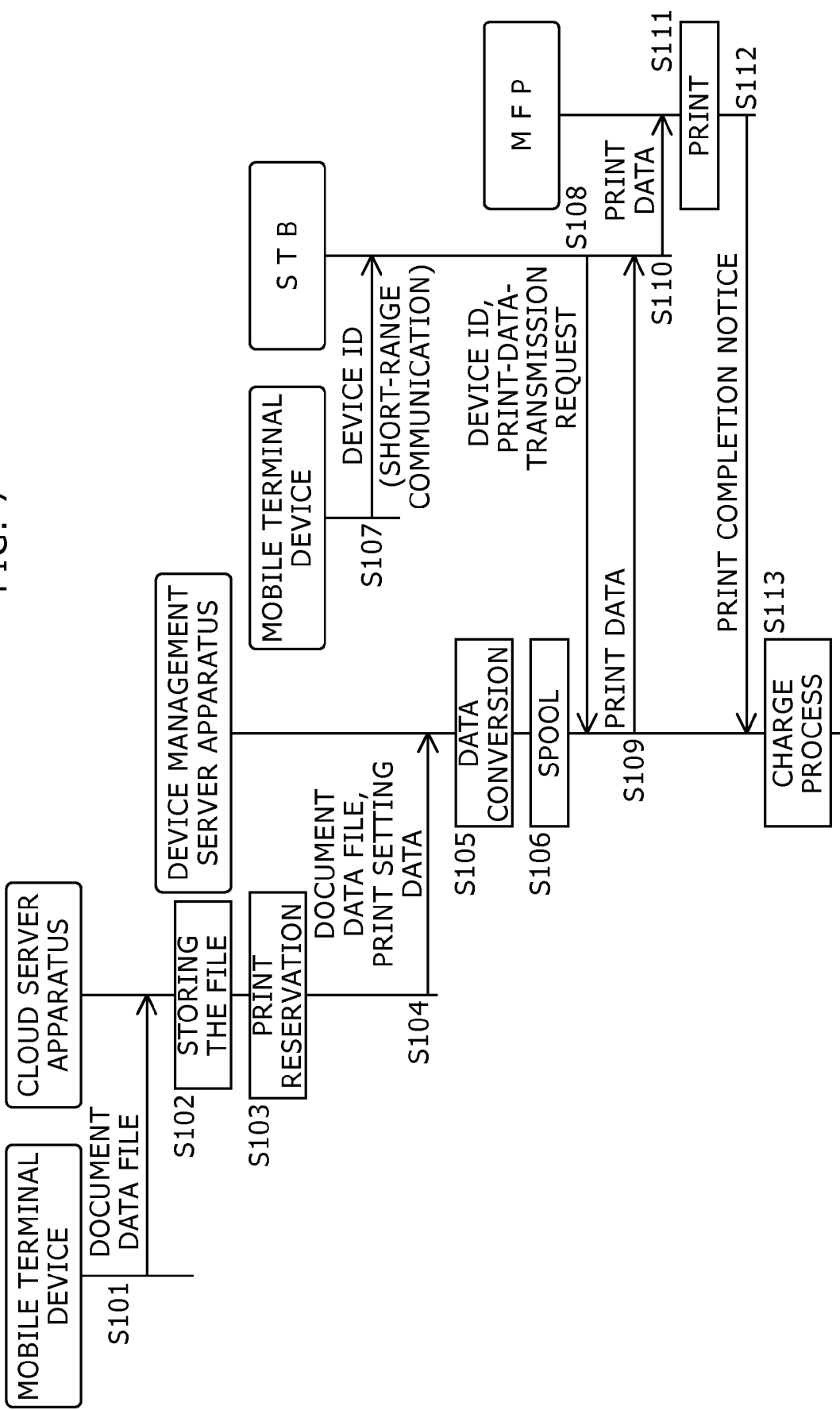
FIG. 7 shows a sequence diagram that explains the first operation of the image forming system in Embodiment 1.

FIG. 7 shows a sequence diagram that explains the first operation of the image forming system in Embodiment 1.

Firstly, a user who carries the mobile terminal device 1 operates the mobile terminal device 1 in order to cause the mobile terminal device 1 to upload a document data file stored in the mobile terminal device 1 to the cloud server apparatus 202. In the mobile terminal device 1, the input device 15 detects a predetermined user operation, and according to the detected user operation, the file transmission processing unit 23 transmits a document data file specified by the user operation via the network 2 to the cloud server apparatus 202 by using the wireless network interface 11 and the network communication processing unit (Step S101).

The cloud server apparatus 202 receives the document data file, and stores the received document data file in association with a user account of the user (Step S102). Afterwards, when the user wants to do printing based on the uploaded document data file, the user operates the mobile terminal device 1 to do "print reservation" for the document data file which the user wants to do printing in the document data files stored in this cloud service (Step S103). For example, for this "print reservation", the user operates the mobile terminal device 1 to cause the mobile terminal device 1 to access the cloud server apparatus 202, and to register the print setting data in association with the device ID of this mobile terminal device 1, and to edit the registered print setting data.

The job register processing unit 221 of the device management server apparatus 201 monitors whether or not a document data file in association with any device ID in the registered-device data 31a is stored in the cloud server apparatus 202. If such document data file is detected in the cloud server apparatus 202, then the job register processing unit 221 downloads the document data file from the cloud server apparatus 202 (Step S104). At the time, if print setting data in association with the document data file, the user, or the device ID is stored in the cloud server apparatus 202, then the job register processing unit 221 downloads the print setting data with the document data file.

Upon downloading the document data file, from the document data file, the data conversion unit 43 generates print data based on print setting specified by the downloaded print setting data (if downloaded) or default print setting data in the registered-device data 31a (if not downloaded) (Step S105).

The job register processing unit 221 causes the spool processing unit 222 to store the generated print data (Step S106). If the downloaded document data file has a data format which can be processed by the multi function peripheral 5A or 5B, then the data conversion unit 43 does not convert it and causes the spool processing unit 222 to store the downloaded document data file as the print data.

After the user who carries the mobile terminal device 1 uploads the document data file to the cloud server apparatus 202 and does "print reservation", the user with the mobile terminal device 1 comes to the place where a multi function peripheral and a set top box which the user wants to use for printing are disposed such as the multi function peripheral 5A and the set top box 6A, or the multi function peripheral 5B and the set top box 6B.

Due to this user behavior, the short-range communication interface 12 of the mobile terminal device 1 moves into a communicable area of the short-range communication interface 102 of the set top box 6A or 6B. At the time, upon establishing a connection between this short-range communication interface 102 and the short-range communication interface 12, the short-range communication processing unit 22 of the mobile terminal device 1 transmits the device ID of the mobile terminal device 1 using the short-range communication interface 12, and the short-range communication processing unit 112 of the set top box 6A or 6B receives the device ID of the mobile terminal device 1 using the short-range communication interface 102 (Step S107). In case that the MAC address 12a is used as the device ID, if the short-range communication processing unit 112 receives the MAC address 12a when the connection is established with the mobile terminal device 1, then the short-range communication processing unit 112 identifies and uses the MAC address 12a as the device ID upon the establishing the connection.

The print data acquisition unit 113 of the set top box transmits a print-data-transmission request with the received device ID to the device management server apparatus 201 by using the network communication processing unit 111 and the network interface 101 (Step S108). If the device ID transmitted from the set top box is not registered in the registered-device data 31a, then the device management server apparatus 201 may discard the print-data-transmission request received with the device ID. Consequently, it is prohibited to perform printing according to a request from an unregistered mobile terminal device.

In the device management server apparatus 201, the job transmission processing unit 44 receives the print-data-transmission request and the device ID using the network interface 32 and the network communication processing unit 41, and reads out print data in association with the received device ID from the spool processing unit 222, and transmits the print data to the set top box as the requester using the network interface 32 and the network communication processing unit 41 (Step S109).

In the set top box, the print data acquisition unit 113 receives the print data using the network communication processing unit 111 and transmits the network interface 101, and transmits the print data to the multi function peripheral connected to this set top box using the peripheral device interface 103 (Step S110).

In the multi function peripheral, the control unit 92 receives the print data using the peripheral device interface 83, and performs printing based on the print data using the printer 84 (Step S111). Therefore, the user obtains a printed paper sheet based on the document data file stored in the mobile terminal device 1 which the user carries.

Upon finishing the printing, the control unit 92 transmits a print completion notice of the print data to the device management server apparatus 201 either via the set top box or via the network 2 directly (i.e. not via the set top box) (Step S112).

In the device management server apparatus 201, the charge processing unit 45 receives the print completion notice using the network interface 32 and the network communication processing unit 41, and performs a charge process of the print data corresponding to the print completion notice upon receiving the print completion notice (Step S113).

If an unshown coin vendor machine is connected to the set top box, the charge processing unit 45 performs the charge process using the coin vendor machine. Otherwise, if an external server is used for the charge system such as credit card payment service, the charge processing unit 45 accesses the external server to perform the charge process.

In the aforementioned Embodiment 1, the mobile terminal device 1 has the wireless communication interface 11, and the short-range communication interface 12 of which the maximum communicable distance is shorter than that of the wireless communication interface 11, and transmits a document data file with its device ID to the cloud server apparatus 202 using the wireless communication interface 11. The device management server apparatus 201 downloads one or more document data files in association with one or more device IDs unique to one or more predetermined mobile terminal devices from the cloud server apparatus 202, and transmits print data corresponding to the document data file upon receiving a request. Each of the set top boxes 6A and 6B has a short-range communication interface 102 of a communication protocol which is the same as that of the short-range communication interface 12 of the mobile terminal device 1, and detects the mobile terminal device 1 around this set top box 6A or 6B using the short-range communication interface 102. Upon detecting the mobile terminal device 1, the set top box 6A or 6B obtains the device ID of the detected mobile terminal device 1, and transmits a transmission request for print data received with the device ID by the device management server apparatus 201, and receives the print data from the device management server apparatus 201, and supplies the print data to the multi function peripheral 5A or 5B to perform printing based on the print data.

In the aforementioned mobile printing system, the device management server apparatus 201 intensively performs a printing-related process (charge process, managing print setting, managing authorization setting, etc.) different for each of mobile terminal devices. Further, since the mobile terminal device 1 transmits its device ID using the short-range communication interface 12, a device (e.g. the set top box 6A or 6B) positioned at a relatively long distance from the mobile terminal device 1 is not detected as a candidate of a receiver of the device ID. Therefore, the user who carries the mobile terminal device 1 causes a device (the multi function peripheral 5A or 5B) which the user wants to use for printing to perform the printing. Furthermore, since this system has a print-control device (the set top box 6A or 6B) as another device than an image forming apparatus (the multi function peripheral 5A or 5B), it is possible to join an existent image forming apparatus to this system without any adaptation nor changes, and to detect the mobile terminal device, receive and transmit its device ID by the set top box for the existent image forming apparatus. Furthermore, since the device management server apparatus 201 obtains a document data file via the cloud service, the user can use the print service of this system using software to access the cloud service such as web browser installed in the mobile terminal device 1.

<The Second Operation>

Figure 8:
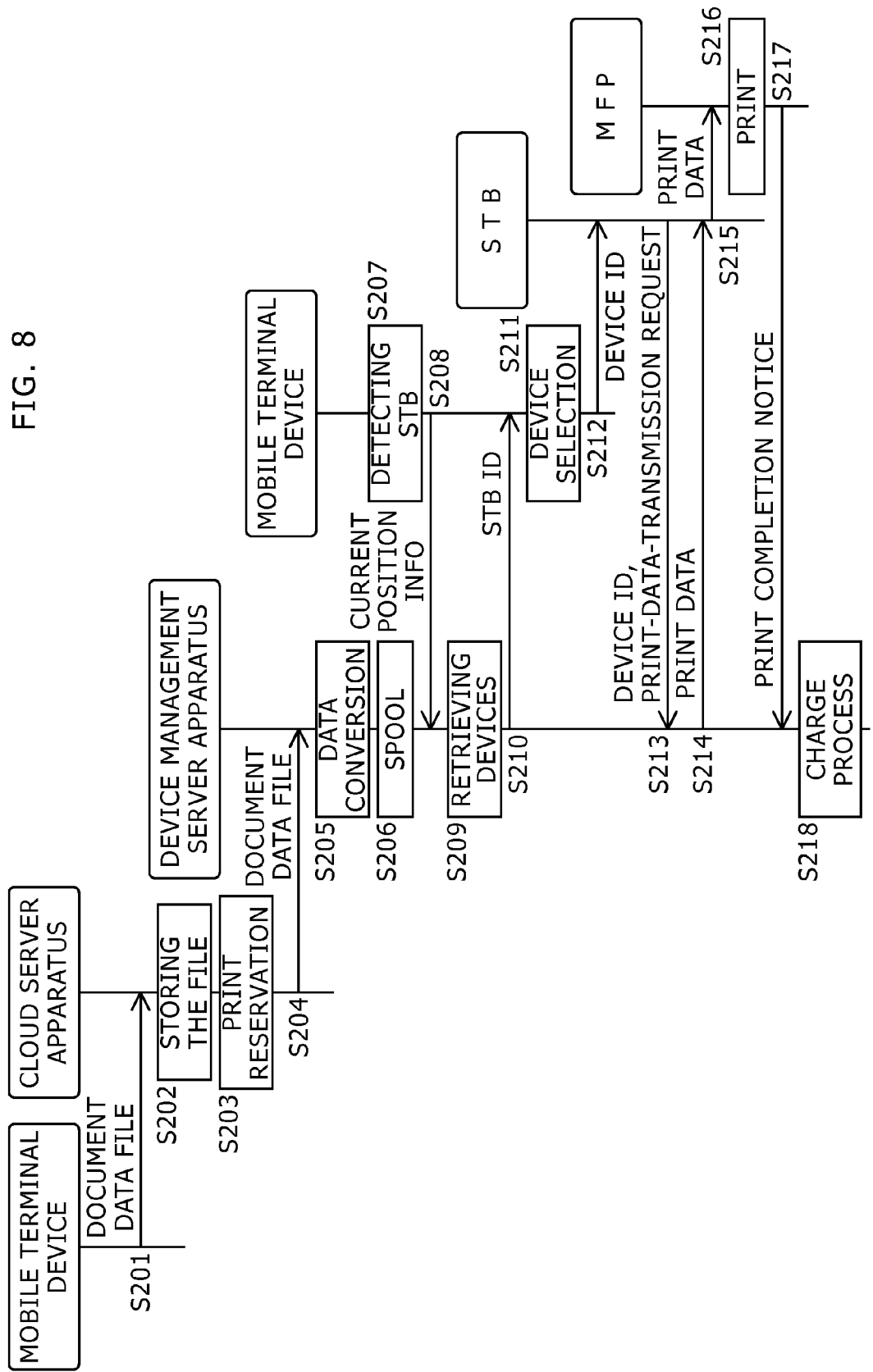
FIG. 8 shows a sequence diagram that explains the second operation of the image forming system in Embodiment 1.

FIG. 8 shows a sequence diagram that explains the second operation of the image forming system in Embodiment 1.

Processes of Steps S201 to S206 in the second operation are the same as the processes of Steps S101 to S106 in the first operation. The second operation includes different operation from the first operation. The different operation is operation after the user who carries the mobile terminal device 1 uploads the document data file to the cloud server apparatus 202 and does "print reservation", and comes to the place where a multi function peripheral and a set top box which the user wants to use for printing are disposed. In the following part, the different operation is explained.

If a set of the multi function peripheral 5A and the set top box 6A is disposed near a set of the multi function peripheral 5B and the set top box 6B, due to this user behavior, the short-range communication interface 12 of the mobile terminal device 1 moves into both communicable areas of the short-range communication interfaces 102 of the set top boxes 6A and 6B at the same time.

At the time, the short-range communication processing unit 22 of the mobile terminal device 1 detects both the set top boxes 6A and 6B (Step S207).

If the plural set top boxes 6A and 6B are detected by the short-range communication processing unit 22, the device designation unit 24 transmits the device ID and the current position information obtained from the GPS device 17 to the device management server apparatus 201 using the network communication processing unit 21 (Step S208).

In the device management server apparatus 201, the position management unit 46 receives the current position information and the device ID from the mobile terminal device 1, and identifies a set top box nearest from the position specified in the received current position information by referring the position data 31b if the received device ID is registered in the registered-device data 31a (Step S209). The position management unit 46 reads out the ID of the identified set top box from the position data 31a, and transmits the ID to the mobile terminal device 1 using the network communication processing unit 41 (Step S210).

In the mobile terminal device 1, the device designation unit 24 receives the ID using the network communication processing unit 21, and selects the set top box having the ID (e.g. the set top box 6A) from the detected set top boxes 6A and 6B, and causes the short-range communication processing unit 22 to establish a connection with the selected set top box (e.g. the set top box 6A) (Step S211). Upon establishing the connection, the short-range communication interface 102 of the selected set top box receives the device ID (here, MAC address 12a) of the mobile terminal device 1 from the short-range communication interface 12 of the mobile terminal device 1 (Step S212). The following operation (Steps S213 to S218) are the same as the corresponding operation (Steps S108 to S113) of the first operation.

As mentioned, the device management server apparatus 201 downloads one or more document data files in association with one or more device IDs unique to one or more predetermined mobile terminal devices from the cloud server apparatus 202, and transmits print data (which can be processed by the multi function peripheral 5A or 5B) corresponding to the document data file upon receiving a request.

If the mobile terminal device 1 detects plural set top boxes 6A and 6B around the mobile terminal device 1, then the mobile terminal device 1 transmits the current position information obtained from the GPS device 17 to the device management server apparatus 201, and receives the ID of the nearest set top box from the current position of this mobile terminal device 1, and establishes a connection with the nearest set top box identified by the ID. At the time, the device management server apparatus 3 selects the nearest set top box by referring the position data 31b from the plural set top boxes 6A and 6B. The set top boxes 6A and 6B are connected to plural multi function peripherals 5A and 5B, respectively. Each of the set top boxes 6A and 6B detects the mobile terminal device 1 around this set top box 6A or 6B. Upon detecting the mobile terminal device 1, the set top box which establishes a connection with the mobile terminal device 1 transmits a transmission request for print data received with the device ID by the device management server apparatus 201, and receives the print data, and supplies the print data to the multi function peripheral 5A or 5B connected to this set top box to perform printing based on the print data.

In the aforementioned mobile printing system, the device management server apparatus 201 intensively performs a printing-related process (charge process, managing print setting, managing authorization setting, etc.) different for each of mobile terminal devices. Further, since the device ID is used rather than a user ID in this system, the user is not required to input an ID, and it is possible to prevent impersonation due to information leakage of the ID. Furthermore, in case of selecting an image forming apparatus by using a short-range communication system for printing, an image forming apparatus (here, the multi function peripheral 5A or 5B) near the user is selected. Furthermore, since the device management server apparatus 201 obtains a document data file via the cloud service, the user can use the print service of this system using software to access the cloud service such as web browser installed in the mobile terminal device 1.

In the second operation, the device management server apparatus 201 selects the nearest set top box from the mobile terminal device 1. Alternatively, the device management server apparatus 201 may select plural set top boxes near the mobile terminal device 1 from the set top boxes based on the position data 31b, and generate a list of the selected set top boxes in which the selected set top boxes are arranged in the order of distances from the mobile terminal device 1, and transmit the list to the mobile terminal device 1. In this case, the mobile terminal device 1 may receive the list which includes IDs of the selected set top boxes and establish a connection with any set top box in the list using the set top box's ID. For example, the mobile terminal device 1 displays the list in the display device 14, and establishes a connection with one of the set top boxes in the list using the ID selected by a user operation to the input device 15.

Further, in the second operation, if the multi function peripheral 5A and the set top box 6A, and the multi function peripheral 5B and the set top box 6B do not have the GPS function, then when the mobile terminal device 1 is positioned at the place where the multi function peripheral 5A or 5B is disposed, the mobile terminal device 1 may register position information obtained by the GPS device 17 as position information of the multi function peripheral 5A or 5B via the network 2 into the device management server apparatus 201.

<The Third Operation>

Figure 9:
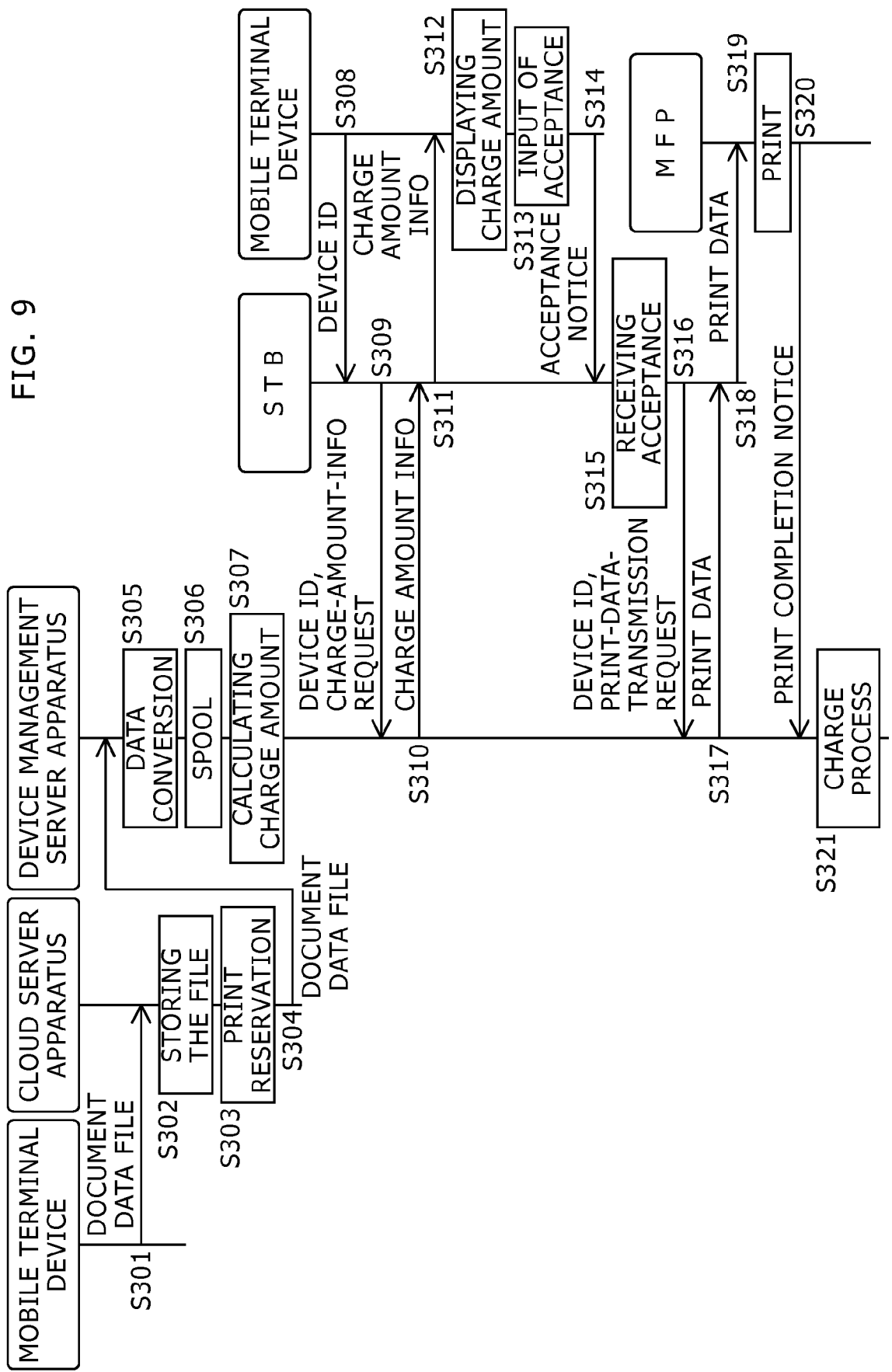
FIG. 9 shows a sequence diagram that explains the third operation of the image forming system in Embodiment 1.

FIG. 9 shows a sequence diagram that explains the third operation of the image forming system in Embodiment 1.

Processes of Steps S301 to S306 in the third operation are the same as the processes of Steps S101 to S106 in the first operation. The third operation includes different operation from the first operation. The different operation is operation after the job register processing unit 221 causes the spool processing unit 222 to store print data in Step S306. In the following part, the different operation is explained.

Upon storing the print data by the spool processing unit 222, the charge processing unit 45 calculates a charge amount charged for printing based on the print data in advance, and stores the calculated charge amount information in association with the device ID or the print data in the storage device 31 or the like (Step S307).

After the user who carries the mobile terminal device 1 uploads the document data file to the cloud server apparatus 202 and does "print reservation", the user with the mobile terminal device 1 comes to the place where a multi function peripheral and a set top box which the user wants to use for printing are disposed such as the multi function peripheral 5A and the set top box 6A, or the multi function peripheral 5B and the set top box 6B.

Due to this user behavior, the short-range communication interface 12 of the mobile terminal device 1 moves into a communicable area of the short-range communication interface 102 of the set top box 6A or 6B. At the time, upon establishing a connection between this short-range communication interface 102 and the short-range communication interface 12, the short-range communication interface 102 of the set top box with which the connection is established (here, the set top box 6A or 6B) receives the device ID (here, MAC address 12a) of the mobile terminal device 1 using the short-range communication interface 102 (Step S308).

The set top box 6A or 6B which established the connection transmits a charge-amount-information-transmission request to the device management server apparatus 201 with the device ID by using the network communication processing unit 111 (Step S309). In the device management server apparatus 201, the charge processing unit 45 receives the charge-amount-information-transmission request and the device ID, and transmits charge amount information of print data corresponding to a document data file in association with the received device ID to the set top box 6A or 6B as the requester (Step S310).

The set top box 6A or 6B receives the charge amount information using the network communication processing unit 111, and transmits a display instruction of an input screen and the charge amount information to the mobile terminal device 1 using the short-range communication processing unit 112 and the short-range communication interface 102 (Step S311).

Figure 10:
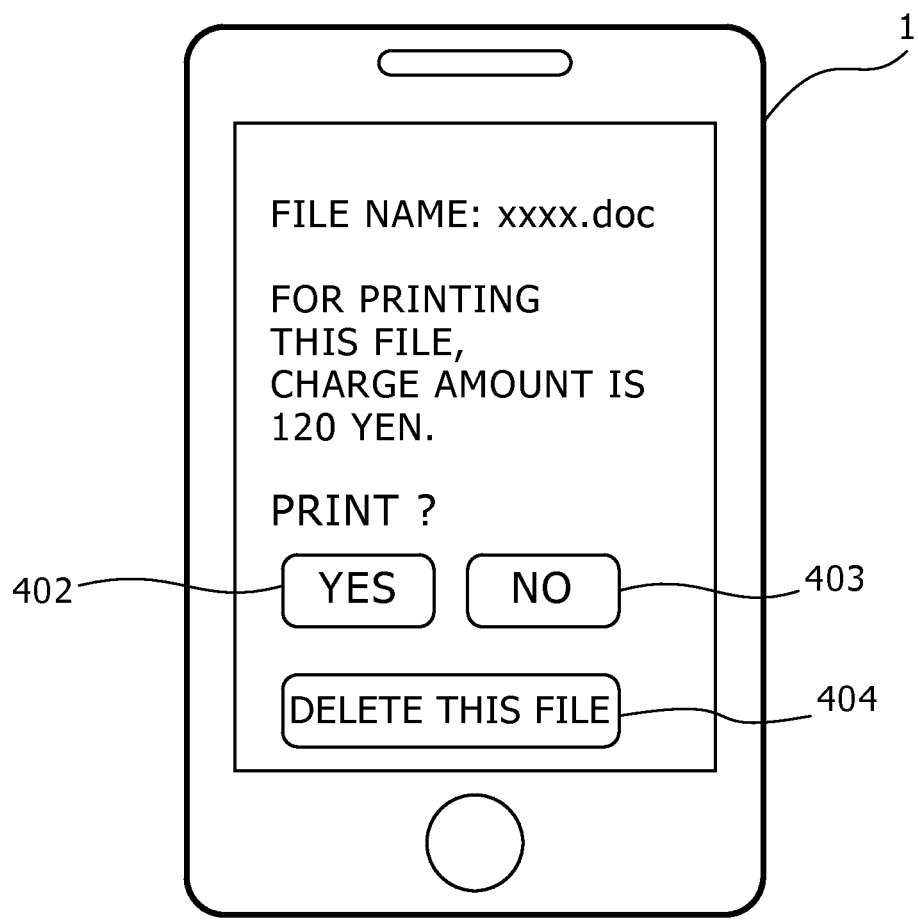
FIG. 10 shows an instance of an input screen to input acceptance for printing in the third operation of the image forming apparatus in Embodiment 1.

The mobile terminal device 1 receives the display instruction and the charge amount information, and upon receiving them, displays the input screen which indicates the charge amount in the display device 14 as shown in FIG. 10 (Step S312).

If a print-acceptance button 402 in the input screen is pushed (Step S313), the mobile terminal device 1 transmits this user operation information to the set top box 6A or 6B with which the connection is established using the short-range communication processing unit 22 and the short-range communication interface 12 (Step S314). If a print-cancel button 403 or a file-delete button 404 is pushed, the mobile terminal device 1 also transmits this user operation information to the set top box 6A or 6B with which the connection is established.

The set top box 6A or 6B receives the user operation information using the short-range communication processing unit 122 and the short-range communication interface 102, and upon receiving it, causes the print data acquisition unit 113 to obtain print data and perform printing based on the print data if the user operation information indicates pushing the print-acceptance button 402 (Step S315).

Otherwise, if the user operation information indicates pushing the print-cancel button 403, the set top box 6A or 6B ends this process for the detected mobile terminal device 1, and causes mobile terminal device 1 to display the same input screen again for print acceptance either when the mobile terminal device 1 is detected next time or at the timing when a predetermined time elapses. Otherwise, if the user operation information indicates pushing the file-delete button 404, the set top box 6A or 6B transmits a file-delete request and the device ID of the mobile terminal device 1 to the device management apparatus 201 using the network communication processing unit 111. The device management apparatus 201 receives the file-delete request and the device ID, and upon receiving them, deletes a document data file and print data which are stored in association with the device ID.

If the set top box receives the print acceptance (Step S315), the print data acquisition unit 113 transmits a print-data-transmission request to the device management server apparatus 201 with the device ID by using the network communication processing unit 111 and the network interface 101 (Step S316). The following operation (Steps S317 to S321) are the same as the corresponding operation (Steps S109 to S113) of the first operation.

Figure 11:
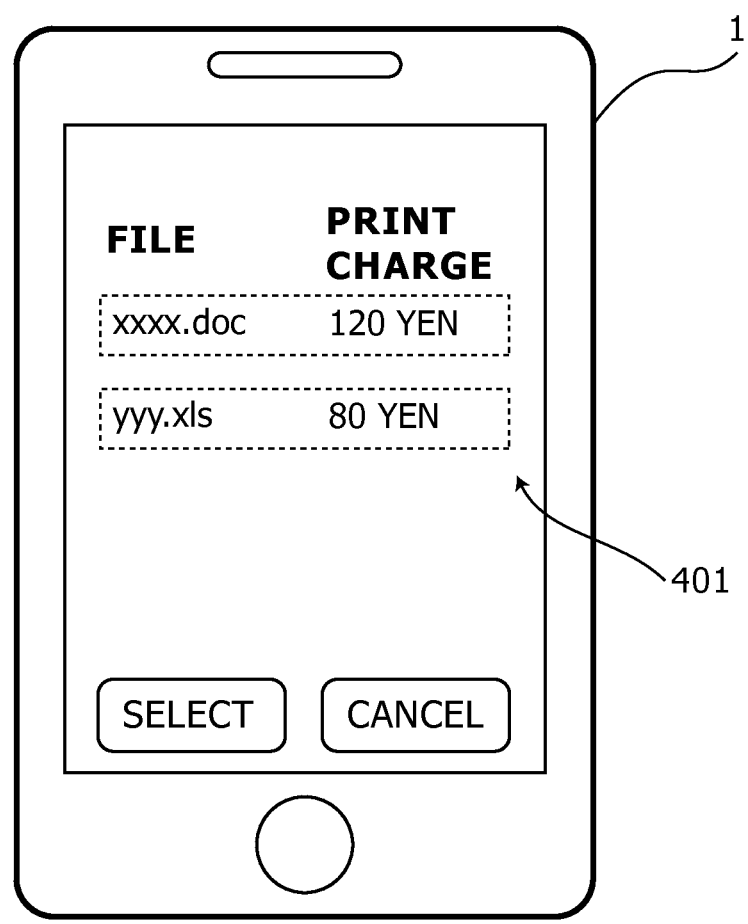
FIG. 11 shows an instance of an input screen which displays a print data list in the third operation of the image forming apparatus in Embodiment 1.

In the third operation, the set top box 6A or 6B may obtain a list of print data in association with the device ID of the detected mobile terminal device 1 from the device management apparatus 201, and transmit the list to the mobile terminal device 1 using the short-range communication interface to cause to display the list, and obtain print data selected in the list according to a user operation from the device management apparatus 201. FIG. 11 shows a diagram which indicates an instance of a list of print data. For example, a list 401 is displayed as shown in FIG. 11, and the list 401 includes a file name of a document data file and a charge amount which correspond to each of pieces of the print data.

In the third operation, the charge amount information and the display instruction of the input screen are transmitted to the mobile terminal device 1, and the charge amount information and the input screen are displayed. Alternatively, the charge amount information and the input screen may be displayed either in the display device 104 of the set top box 6A or 6B or in the display device 81a of the multi function peripheral 5A or 5B.

As mentioned, the device management server apparatus 201 downloads one or more document data files in association with one or more device IDs unique to one or more predetermined mobile terminal devices from the cloud server apparatus 202, and transmits print data (which can be processed by the multi function peripheral 5A or 5B) corresponding to the document data file upon receiving a request. Each of the set top boxes 6A and 6B detects the mobile terminal device 1 around this set top box 6A or 6B. Upon detecting the mobile terminal device 1, the set top box 6A or 6B obtains the device ID of the detected mobile terminal device 1, and transmits a transmission request for print data received with the device ID by the device management server apparatus 201, and receives the print data, and supplies the print data to the multi function peripheral 5A or 5B to cause to perform printing based on the print data. Further, the device management server apparatus 201 calculates a charge amount charged for printing based on the print data in advance, and transmits the charge amount information to the set top box 6A or 6B. The set top box 6A or 6B receives the charge amount information, and causes to display the charge amount specified by the charge amount information in this set top box 6A or 6B, the mobile terminal device 1, or the multi function peripheral 5A or 5B. After detecting a user operation of print acceptance to this set top box 6A or 6B, the mobile terminal device 1, or the multi function peripheral 5A or 5B, the set top box 6A or 6B transmits a transmission request for print data received with the device ID of the mobile terminal device 1 by the device management server apparatus 201, and receives the print data, and supplies the print data to the multi function peripheral 5A or 5B to cause to perform printing based on the print data.

In the aforementioned mobile printing system, the device management server apparatus 201 intensively performs a printing-related process (charge process, managing print setting, managing authorization setting, etc.) different for each of mobile terminal devices. Further, since this system has a print-control device (the set top box 6A or 6B) as another device than an image forming apparatus (the multi function peripheral 5A or 5B), it is possible to join an existent image forming apparatus to this system without any adaptation nor changes, and to detect the mobile terminal device, and receive its device ID by the set top box for the existent image forming apparatus. Furthermore, since the device management server apparatus 201 obtains a document data file via the cloud service, the user can use the print service of this system using software to access the cloud service such as web browser installed in the mobile terminal device 1.

It should be noted that although the second operation and the third operation were explained individually in the aforementioned image forming system of Embodiment 1, the aforementioned image forming system can perform the combination of the second and the third operation.

Embodiment 2

Figure 12:
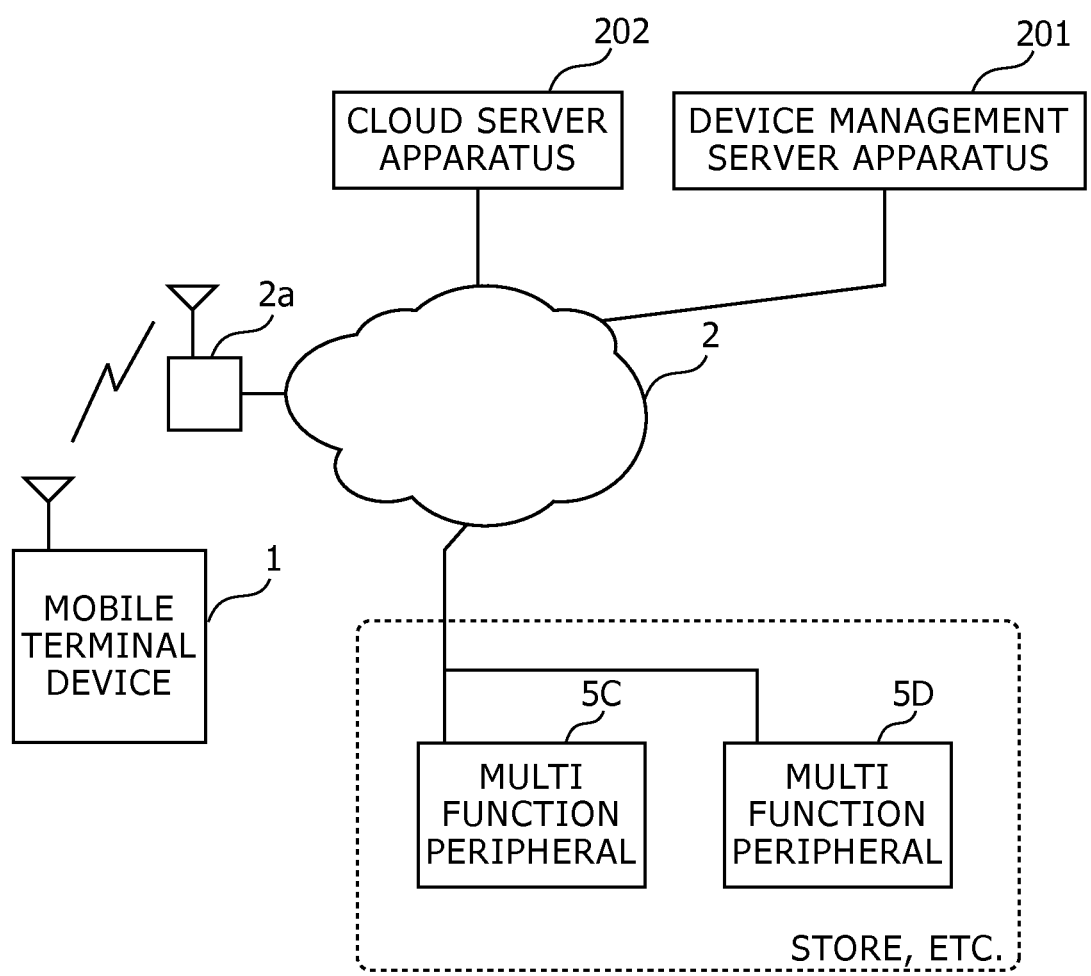
FIG. 12 shows a block diagram that indicates a configuration of an image forming system in Embodiment 2.

FIG. 12 shows a block diagram that indicates a configuration of an image forming system in Embodiment 2 of this disclosure. In this system, multi function peripherals 5C and 5D have not only the functions of the multi function peripherals 5A and 5B but the functions of the set top boxes 6A and 6B, respectively.

In Embodiment 2, the device management server apparatus 201 has a configuration which is either the same as or similar to the configuration of the device management server apparatus 201 of Embodiment 1, and downloads one or more document data files in association with one or more device IDs unique to one or more predetermined mobile terminal devices from the cloud server apparatus 202, and transmits print data (which can be processed by the multi function peripheral 5C or 5D) corresponding to the document data file upon receiving a request from the multi function peripheral 5C or 5D.

The multi function peripherals 5C and 5D are connected to the network 2. Each of the multi function peripherals 5C and 5D is capable of establishing a connection with the mobile terminal device 1, and upon establishing the connection, obtains print data from the device management server apparatus 201 in a manner which is either the same as or similar to that of the set top box 6A or 6B in Embodiment 1.

The multi function peripherals 5C and 5D have basic configurations which are either the same as or similar to those of the multi function peripherals 5A and 5B of Embodiment 1, and in addition, have components that performs the same functions as those of the set top boxes 6A and 6B. The mobile terminal device 1 and the cloud server apparatus 202 of Embodiment 2 have configurations which are either the same as or similar to those of the mobile terminal device 1 and the cloud server apparatus 202 of Embodiment 1, respectively.

Therefore, the system of Embodiment 2 is capable of performing the first, the second and the third operation and the combination of the second and the third operation which are similar to those of Embodiment 1. In the following part, the first operation of Embodiment 2 is explained.

Figure 13:
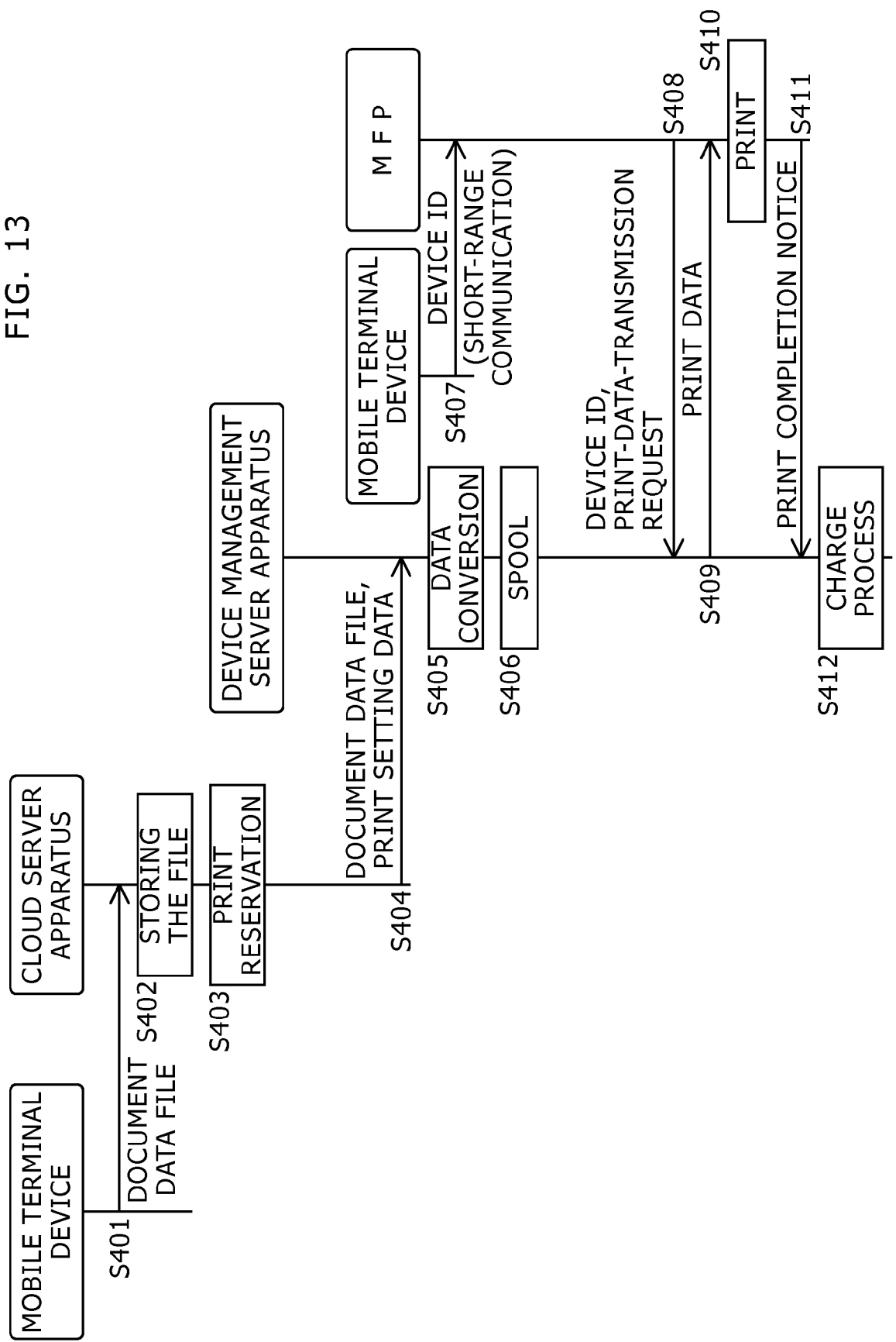
FIG. 13 shows a sequence diagram that indicates the first operation of the image forming system in Embodiment 2.

FIG. 13 shows a sequence diagram that indicates the first operation of the image forming system in Embodiment 2.

After the user who carries the mobile terminal device 1 uploads a document data file to the cloud server apparatus 202 and does "print reservation", the user with the mobile terminal device 1 comes to the place where a multi function peripheral which the user wants to use for printing is disposed such as the multi function peripheral 5C or 5D.

Due to this user behavior, the short-range communication interface 12 of the mobile terminal device 1 moves into a communicable area of the short-range communication interface of the multi function peripheral 5C or 5D. At the time, upon establishing a connection between this short-range communication interface and the short-range communication interface 12, the short-range communication processing unit 22 of the mobile terminal device 1 transmits the device ID of the mobile terminal device 1 using the short-range communication interface 12, and the short-range communication processing unit of the multi function peripheral 5C or 5D receives the device ID of the mobile terminal device 1 using the short-range communication interface of this multi function peripheral 5C or 5D (Step S407). In case that the MAC address 12a is used as the device ID, if the short-range communication processing unit of the multi function peripheral 5C or 5D receives the MAC address 12a when the connection is established with the mobile terminal device 1, then this short-range communication processing unit of the multi function peripheral 5C or 5D identifies and uses the MAC address 12a as the device ID upon the establishing the connection.

The print data acquisition unit of the multi function peripheral transmits a print-data-transmission request with the received device ID to the device management server apparatus 201 by using the network communication processing unit and the network interface (Step S408).

In the device management server apparatus 201, the job transmission processing unit 44 receives the print-data-transmission request and the device ID using the network interface 32 and the network communication processing unit 41, and reads out print data in association with the received device ID from the spool processing unit 222, and transmits the print data to the multi function peripheral as the requester using the network interface 32 and the network communication processing unit 41 (Step S409).

In the multi function peripheral, the print data acquisition unit receives the print data using the network communication processing unit and the network interface of the multi function peripheral, and upon receiving them, the control unit performs printing based on the print data using the printer (Step S410).

Other processes (Steps S401 to S406, and Steps S411 and S412) are the same as the processes (Steps S101 to S106, and Steps S112 and S113), and therefore these processes are not explained here.

In the aforementioned Embodiment 2, the mobile terminal device 1 has the wireless communication interface 11, and the short-range communication interface 12 of which the maximum communicable distance is shorter than that of the wireless communication interface 11, and transmits a document data file with its device ID to the cloud server apparatus 202 using the wireless communication interface 11. The device management server apparatus 201 downloads one or more document data files in association with one or more device IDs unique to one or more predetermined mobile terminal devices from the cloud server apparatus 202, and transmits print data (which can be processed by the multi function peripheral 5C or 5D) corresponding to the document data file upon receiving a request. Each of the multi function peripherals 5C and 5D has a short-range communication interface of a communication protocol which is the same as that of the short-range communication interface of the mobile terminal device 1, and detects the mobile terminal device 1 around this multi function peripheral 5C or 5D. Upon detecting the mobile terminal device 1, the multi function peripheral 5C or 5D obtains the device ID of the detected mobile terminal device 1, and transmits a transmission request for print data received with the device ID by the device management server apparatus 201, and receives the print data, and performs printing based on the print data.

In the aforementioned mobile printing system, the device management server apparatus 201 intensively performs a printing-related process (charge process, managing print setting, managing authorization setting, etc.) different for each of mobile terminal devices. Further, since the mobile terminal device 1 transmits its device ID using the short-range communication interface 12, a device (e.g. the multi function peripheral 5C or 5D) positioned at a relatively long distance from the mobile terminal device 1 is not detected as a candidate of a receiver of the device ID. Therefore, the user who carries the mobile terminal device 1 causes a device (the multi function peripheral 5C or 5D) which the user wants to use for printing to perform the printing. Furthermore, since the device management server apparatus 201 obtains a document data file via the cloud service, the user can use the print service of this system using software to access the cloud service such as web browser installed in the mobile terminal device 1.

The description of the present invention has been presented for purposes of illustration and description, and is not intended to be exhaustive or limited to the invention in the form disclosed. Many modifications and variations will be apparent to those of ordinary skill in the art.

For example, the set top box 6A or 6B in Embodiment 1 may have a mobile-terminal-detection device, and the multi function peripheral 5C or 5D in Embodiment 2 may have a mobile-terminal-detection device. The mobile-terminal-detection device is a device that detects a predetermined user operation of a user who carries the mobile terminal device 1. For example, the mobile-terminal-detection device detects the user operation to place the mobile terminal device 1 on a predetermined position by the user. In this case, the mobile-terminal-detection device detects the mobile terminal device 1 placed on the position by using a contact switch and/or an uncontact switch such as infrared sensor.

Figure 14:
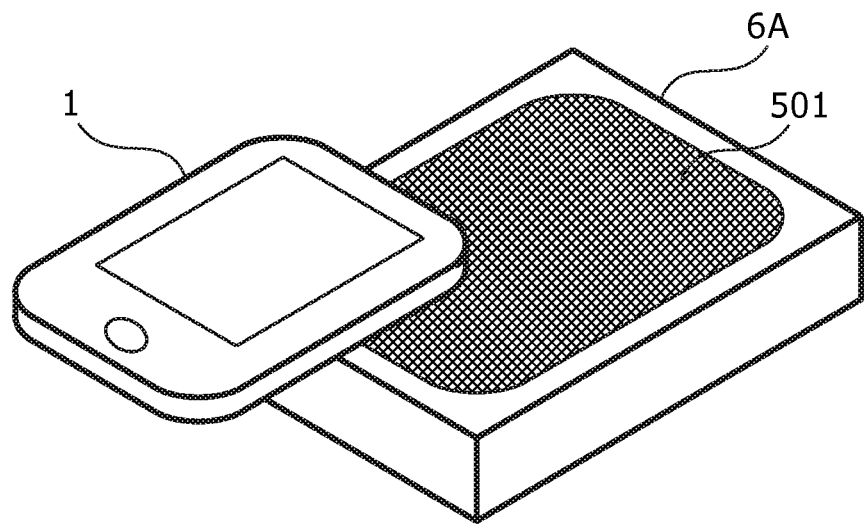
FIG. 14 shows a perspective view of a set top box in Embodiment 1.

FIG. 14 shows a perspective view of the set top box 6A in Embodiment 1. A placing area 501 is formed on the top surface of the set top box 6A, and the mobile-terminal-detection device detects the mobile terminal device 1 placed on the placing area 501.

Further, the short-range communication interface 102 may be disposed near the placing area 501 (e.g. beneath the placing area 501). In such case, if plural mobile terminal devices are positioned around the set top box, the intensity of a radio wave received from the short-range communication interface 102 of the mobile terminal device 1 placed on the placing area 501 is larger than those of other mobile terminal devices. Therefore, the mobile terminal device which the user did the operation is correctly selected.

Further, in Embodiment 1 and Embodiment 2, the document data file and the print data stored by the device management server apparatus 201 may be deleted (a) immediately after transmitting the print data according to the transmission request, (b) immediately after receiving the print completion notice, or (c) at the timing when a predetermined time (which enables re-printing) elapses from transmitting the print data or receiving the print completion notice.

Furthermore, in Embodiment 1, the set top box 6A or 6B may transmit a machine-type information of the multi function peripheral 5A or 5B connected to this set top box 6A or 6B with the print-data-transmission request to the device management server apparatus 201, and the device management server apparatus 201 may generate print data compatible with a machine type specified by the machine-type information from a document data file, and transmit the print data. Similarly, in Embodiment 2, the multi function peripheral 5C or 5D may transmit a machine-type information of this multi function peripheral 5C or 5D with the data-transmission request to the device management server apparatus 201, and the device management server apparatus 201 may generate print data compatible with a machine type specified by the machine-type information from a document data file, and transmit the print data. This machine-type information may include option information which indicates whether or not the multi function peripheral has been equipped with an option function such as finisher.

Furthermore, in Embodiment 1, the set top box 6A and the multi function peripheral 5A are connected to each other by the peripheral device interfaces 83 and 103. Alternatively, the set top box 6A and the multi function peripheral 5A may be connected by the network interfaces 82 and 101, and transmit and receive the print data via the network 2.

Furthermore, in Embodiment 1 and Embodiment 2, another type of an image forming apparatus which has a printer function such as printer may be used instead of the multi function peripheral 5A, 5B, 5C or 5D.

Furthermore, in Embodiment 1 and Embodiment 2, the device management server apparatus 201 has the spool function. Alternatively, the system may include another server apparatus (job management server apparatus) than the device management server apparatus 201, and the job management server apparatus may spool the print data.

Furthermore, in Embodiment 1 and Embodiment 2, upon user input of a code (e.g. 4 digits of alphabet and/or number) to the mobile terminal device 1, the mobile terminal device 1 may transmit the code with its device ID to either the set top box 6A or 6B or the multi function peripheral 5C or 5D, and then upon user input of a code to either the set top box 6A or 6B or the multi function peripheral 5C or 5D, either the set top box 6A or 6B or the multi function peripheral 5C or 5D may transmit the print-data-transmission request if the code received from the mobile terminal device 1 is the same as the directly inputted code, and otherwise, not transmit the print-data-transmission request.

Furthermore, in Embodiment 1 and Embodiment 2, either the set top box 6A or 6B or the multi function peripheral 5C or 5D may obtain a list of print data in association with the device ID of the detected mobile terminal device 1 from the device management apparatus 201, and transmit the list to the mobile terminal device 1 using the short-range communication interface to cause to display the list, and obtain print data selected in the list according to a user operation from the device management apparatus 201. This list may be displayed either by the display device 104 of the set top box 6A or 6B or by the display device 81*a* of the multi function peripheral 5A, 5B, 5C or 5D.

Furthermore, in Embodiment 1, the system may not have the device management server apparatus 201, in which the set top box 6A or 6B may have functions of the device management server apparatus 201.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A mobile printing system, comprising:
 a cloud server apparatus configured to store a document data file;
 a mobile terminal device, that includes a wireless communication interface and a first short-range communication interface of which the maximum communicable distance is shorter than that of the wireless communication interface, configured to transmit the document data file with its device ID to the cloud server apparatus via the wireless communication interface;
 a device management server apparatus configured to receive the document data file in association with the device ID from the cloud server apparatus, convert the document data file to print data, store the print data, and transmit the print data;
 a print-control device, that includes a second short-range communication interface of a communication protocol which is the same as that of the first short-range communication interface, configured to detect the mobile terminal device, receive the device ID of the mobile terminal device, receive the print data corresponding to the document data file in association with the device ID from the document management server apparatus, and transmit the print data; and
 an image forming apparatus configured to receive the print data from the print-control device, and perform printing of the print data
 wherein: the mobile terminal device further includes a first position determination device configured to specify a current position of the mobile terminal device;
 the print-control device further includes a second position determination device configured to specify the current position of the print-control device; and
 the device management server apparatus is further configured to store the current positions of a plurality of print-control devices in association with IDs of the plurality of print-control devices, and
 the mobile terminal device is further configured to transmit the current position of the mobile terminal device to the device management server apparatus when the mobile terminal device detects the plurality of print-control devices, and receive at least one of the IDs of the plurality of print-control devices from the device management server apparatus, the ID of the print-control device specified by the device management server apparatus being on the basis of both the current positions of the plurality of detected print-control devices and the current position of the mobile terminal device.

2. The mobile printing system according to claim 1, wherein:
 the device ID includes an ID of the first short-range communication interface.

3. The mobile printing system according to claim 1, wherein:
 the device ID includes a MAC address of the first short-range communication interface.

4. The mobile printing system according to claim 1, wherein:
 the wireless communication interface includes a baseband circuit of a mobile phone.

5. The mobile printing system according to claim 1, wherein:
 the wireless communication interface includes a wireless LAN interface of IEEE802.11.

6. The mobile printing system according to claim 1, wherein:
 the first and the second short-range communication interfaces include Bluetooth communication circuits of either Power Class 2 or Power Class 3.

7. The mobile printing system according to claim 1, wherein:
 the device management server apparatus is configured to convert the document data file to the print data according to print setting specified in print setting data in association with the device ID of the mobile terminal device.

8. The mobile printing system according to claim 7, wherein:
 the print setting data includes authorization setting information.

9. The mobile printing system according to claim 7, wherein:
 the device management server apparatus is further configured to receive the print setting data from the cloud server apparatus.

10. The mobile printing system according to claim 1, wherein:
 the device management server apparatus is further configured to specify the print-control device that is positioned nearest from the mobile terminal device in the plurality of detected print-control devices.

11. The mobile printing system according to claim 1, wherein:
 the device management server apparatus is further configured to specify print-control devices that are positioned within a predetermined distance from the current position of the mobile terminal device, and generate a list of the plurality of specified print-control devices with IDs of the plurality of specified print-control devices; and
 the mobile terminal device is further configured to select one of the IDs of the plurality of specified print-control devices from the list.

12. The mobile printing system according to claim 11, wherein:
 the device management server apparatus is further configured to generate the list in which the plurality of specified print-control devices are arranged in the order of distances from the current position of the mobile terminal device.

13. The mobile printing system according to claim 1, wherein:
 the device management server apparatus is further configured to calculate a charge amount of the printing of the print data, and transmit the charge amount to the print-control device before transmitting the print data; and the print-control device is further configured to receive the charge amount, and display the charge amount in at least one of the print-control device, the mobile terminal device, and the image forming apparatus.

14. The mobile printing system according to claim 13, wherein:

the device management server apparatus is further configured to store charge data that includes the charge amount in association with the device ID of the mobile terminal device.

15. The mobile printing system according to claim 1, wherein:

the device management server apparatus is further configured to login the cloud server apparatus repeatedly at predetermined timings, determine whether the document data file in association with the device ID is stored in the cloud server apparatus, and if a new document data file in association with the device ID is stored in the cloud server apparatus, receive the new document data file.

16. The mobile printing system according to claim 1, wherein:

the print-control device is further configured to receive a list of the print data corresponding to the document data file in association with the device ID; and the image forming apparatus is further configured to perform printing of the print data selected from the list of the print data.

17. A mobile printing system, comprising:

a cloud server apparatus configured to store a document data file;

a mobile terminal device, that includes a wireless communication interface and a first short-range communication interface of which the maximum communicable distance is shorter than that of the wireless communication interface, configured to transmit the document data file with its device ID to the cloud server apparatus via the wireless communication interface;

a device management server apparatus configured to receive the document data file in association with the device ID from the cloud server apparatus, convert the document data file to print data, store the print data, and transmit the print data; and an image forming apparatus, that includes a second short-range communication interface of a communication protocol which is the same as that of the first short-range communication interface, configured to detect the mobile terminal device, receive the device ID of the mobile terminal device, receive the print data corresponding to the document data file in association with the device ID from the document management server apparatus, and perform printing of the print data wherein:

the mobile terminal device further includes a first position determination device configured to specify a current position of the mobile terminal device;

the image forming apparatus further includes a second position determination device configured to specify the current position of the image forming apparatus;

the device management server apparatus is further configured to store the current positions of a plurality of image forming apparatuses in association with IDs of the image forming apparatuses; and the mobile terminal device is further configured to transmit the current position of the mobile terminal device to the device management server apparatus when the mobile terminal device detects the plurality of image forming apparatuses, and receive at least one of the IDs of the plurality of image forming apparatuses from the device management server apparatus, the ID of the image forming apparatus specified by the device management server apparatus being on the basis of both the current positions of the plurality of detected image forming apparatuses and the current position of the mobile terminal device.

18. The mobile printing system according to claim 17, wherein:

the device management server apparatus is further configured to calculate a charge amount of the printing of the print data, and transmit the charge amount to the image forming apparatus before transmitting the print data; and the image forming apparatus is further configured to receive the charge amount, and display the charge amount in either the mobile terminal device or the image forming apparatus.

* * * * *